United States Patent [19]
Sako et al.

[11] Patent Number: 5,735,365
[45] Date of Patent: Apr. 7, 1998

[54] POWER STEERING DEVICE

[75] Inventors: Masayuki Sako; Takuro Hirano; Shiro Suo, all of Tokyo, Japan

[73] Assignee: Kayaba Kogyo Kabushiki Kaisha, Tokyo, Japan

[21] Appl. No.: 523,204

[22] Filed: Sep. 5, 1995

[30] Foreign Application Priority Data

Sep. 8, 1994 [JP] Japan ................... 6-214826

[51] Int. Cl.$^6$ ................... B62D 5/22
[52] U.S. Cl. ................... 180/428; 180/427
[58] Field of Search ................... 180/417, 426, 180/427, 428, 441

[56] References Cited

U.S. PATENT DOCUMENTS

| | | |
|---|---|---|
| 3,183,992 | 5/1965 | Brueder .................. 180/428 |
| 4,294,325 | 10/1981 | Numura .................. 180/428 |
| 4,809,806 | 3/1989 | Pietrzak .................. 180/428 |
| 4,939,947 | 7/1990 | Toyoshima et al. .................. 180/428 |
| 5,058,695 | 10/1991 | Terada .................. 180/441 |
| 5,445,240 | 8/1995 | Cunningham et al. .................. 180/417 |

*Primary Examiner*—Brian L. Johnson
*Assistant Examiner*—Avraham H. Lerner
*Attorney, Agent, or Firm*—Jordan and Hamburg

[57] ABSTRACT

A rack and pinion are housed in a gear box, a valve sleeve that is joined to the pinion being housed in a valve housing such that the sleeve is free to rotate. A mechanism is provided that joins the gear box and valve housing in any desired relative rotation position. As the gear box and valve housing are formed independently, they may be formed by different manufacturing methods, and replacement of either of them is also easy. Further, an oil pressure port provided at a fixed position in the valve housing may be disposed at any desired rotation angle by selecting the relative rotation position of the gear box and valve housing.

3 Claims, 9 Drawing Sheets

POWER STEERING DEVICE

BACKGROUND OF THE INVENTION

This invention relates to a power steering device that aids steering of a vehicle using hydraulic power.

Rack and pinion type power steering devices used in automobiles comprise a rack and pinion that directly transmits steering wheel operations to a steering mechanism, a power cylinder that uses the pressure of an oil pump to drive the steering mechanism, and a control valve that supplies this oil pressure to the power cylinder according to steering wheel operations.

In this type of power steering device, a gear housing that houses the rack and pinion is generally formed in a one-piece construction with the control valve housing, and the power cylinder is independent. Such a device is disclosed for example in U.S. Pat. No. 4,809,806 published by the U.S. Patent Office. According to this power steering device, the gear box and control valve housing are formed in a one-piece construction by casting.

In recent automobiles for passengers, there has been a trend towards smaller vehicle size and front wheel drive leading to smaller engine room capacity. As a result, when it is attempted to apply power steering devices to various types of vehicles and engine shapes, it may occur that the control valve port interferes with the engine or other mechanisms, so the position of the control valve port and the layout of the pipe leading to the port have to be changed.

However, when the control valve housing and gear box are formed in a one-piece construction, changing the port position requires that modifications be made to part of the casting process which lead to increase of manufacturing costs. Thermal deformation also occurs when the housing of the control valve is cast in the gear box. A costly post-casting treatment is required on the inner circumference of the valve housing, such as honing.

Moreover, as the gear box and housing of the control valve are formed in a one-piece construction, both have to be rejected if a fault occurs in either the gear box or the housing during the manufacturing process, which leads to decreased yields in the manufacture of the power steering device.

SUMMARY OF THE INVENTION

It is therefore an object of this invention to facilitate changes to the position of a control valve port.

It is another object of this invention to improve the adaptability of a power steering device to different types of vehicle.

It is a further object of this invention to facilitate the machining of a control valve housing.

In order to achieve the above objects, this invention provides a power steering device comprising, an input shaft that rotates according to a steering input, a pinion connected to the input shaft via a torsion bar, a rack engaging with the pinion, a steering mechanism moving in synchronism with the rack, a valve sleeve joined to the pinion, a power cylinder that drives the steering mechanism, a gear box housing the pinion, a valve housing that houses the valve sleeve such that it is free to rotate, an oil pressure port provided in the housing, and an oil path that supplies oil pressure to the power cylinder from the oil pressure port according to the relative rotation positions of the sleeve and the input shaft. The housing and the gear box are independent, and the device further comprises a mechanism for joining the housing and the gear box in any desired relative rotation position.

Preferably, the joining mechanism comprises screw parts that screws into each other formed in both the gear box and valve housing coaxially with the pinion and a lock nut that limits the relative rotation of the housing and gear box joined via the screw parts. The screw parts have pitches such that there is no obstruction to the flow of oil in the oil path when the relative rotation position of the housing and gear box is varied within one rotation.

Alternatively, the joining mechanism comprises engaging parts formed in both the gear box and the housing coaxially with the pinion and a staking part that locks the relative rotation of the engaging parts by staking the staking part from outside.

In this case it is further preferable that the device further comprises a rotation stop mechanism that is formed in one of the engaging parts and bites on the other of the engaging parts with the staking of the staking part, so as to lock the relative rotation of the gear box and the valve housing.

The details as well as other features and advantages of this invention are set forth in the remainder of the specification and are shown in the accompanying drawings.

DETAILED DESCRIPTION OF THE PRESENT INVENTION

Figure 1:
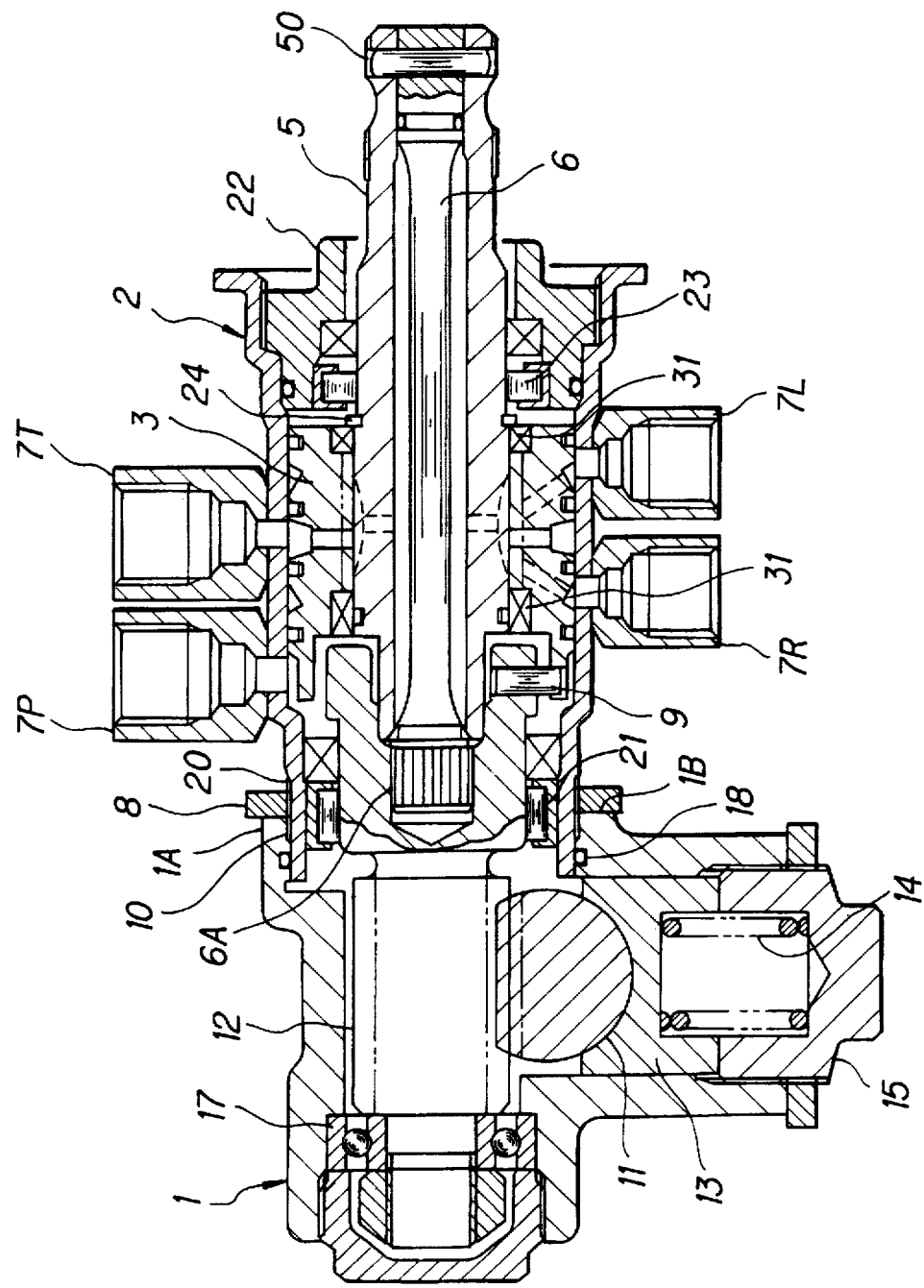
FIG. 1 is a vertical sectional view of a power steering device according to this invention.
Figure 2:
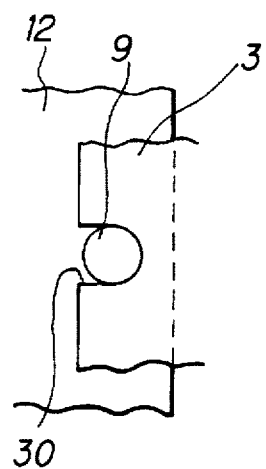
FIG. 2 is an enlarged plan view of a link between a pinion and a valve sleeve according to this invention.

Referring to FIG. 1 of the drawings, a gear box 1 housing a rack and pinion type steering gear and cylindrical vane housing 2 which houses a rotary valve are linked together.

A pinion 12 and rack 11 are housed in the gear box 1. The pinion 12 is supported such that its base end is free to rotate on a bearing 17. The rack 11 is supported by the gear box 1 such that it is free to slide along a slide axis effectively perpendicular to the center axis of the pinion 12.

The rack 11 is connected to a steering mechanism, not shown. The operation of this rack 11 is also assisted by a power cylinder, not shown.

The rack 11 in the gear box 1 is guided in the sliding direction by a pressure pad 13. This pressure pad 13 is pushed toward the pinion 12 by a spring 14. The spring 14 is supported by an adjusting cover 15 that screws into the gear box 1.

The link between the gear box 1 and the valve housing 2 is formed in a cylindrical shape, and the end of the valve housing 2 which is also formed in a cylindrical shape screws into the inner circumference of this cylindrical part 1A. A female screw 10 of predetermined pitch is formed on the inner circumference of this cylindrical part 1A, a male screw 20 of predetermined pitch being formed on the outer circumference of the end of the valve housing 2. A lock nut 8 also screws onto the outer circumference of the valve housing 2 so as to restrict the relative rotation of the gear box 1 and valve housing 2.

A seal member 18 is interposed between the cylindrical part 1A and end of the valve housing 2 in order to maintain the interior of the gear box sealtight.

The pinion 12 projects toward the valve housing 2 through the inside of this cylindrical part 1A.

The end of the pinion 12 that projects into the valve housing 2 is supported that it is free to rotate via a bearing 21. A serration 6A formed at one end of a torsion bar 6 is pressed coaxially into the pinion 12 inside this end.

A control valve comprises a stub shaft 5 and a valve sleeve 3 inside the valve housing 2.

The stub shaft 5 is joined to a steering column, not shown, and is inserted into the valve housing 2 from the opposite side to the link between the gear box 1 and valve housing 2.

The torsion bar 6 is coaxially housed in the stub shaft 5, and its end is connected to a stub shaft 5 by a pin 50.

The stub shaft 5 is supported free to rotate on a bushing 22 joined to the end of the valve housing 2 via a bearing 23. The tip of the stub shaft 5 slides on the pinion 12, and the stub shaft 5 rotates relative to the pinion 12 according to the twist of the torsion bar 6.

The valve sleeve 3 is disposed between the inner circumference of the valve housing 2 and the outer circumference of the stub shaft 5. The valve sleeve 3 slides on the outer circumference of the stub shaft 5 via a seal member 31, and is supported so as to permit rotation relative to the stub shaft 5. The valve sleeve 3 is supported such that it is also free to rotate relative to the valve housing 2.

The rotation of the valve sleeve 3 relative to the pinion 12 is restricted due to the engaging of a U-shaped notch 30 formed at a predetermined position with a pin 9 projecting in a radial direction from the pinion 12. A snap ring 24 is attached to the outer circumference of the stub shaft 5 when the pin 9 is in contact with the deepest part of the notch 30. This limits also the relative displacement of the valve sleeve 3 and pinion 12 in an axial direction.

Ports 7P, 7T, 7L, 7R which are connected to an oil pressure source, not shown, and to the power steering, are provided at predetermined positions on the outer circumference of the valve housing 2. For example, the ports 7P and 7T are provided at a predetermined interval in an axial direction, and the ports 7L, 7R are provided at a predetermined interval in an axial direction at positions effectively opposite the ports 7P, 7T.

Annular grooves facing these ports are formed on the outer circumference of the valve sleeve 3. These grooves are alternately blocked by seal rings. The stub shaft 5 comprises an oil path arranged so that the port 7P is connected to one of the ports 7L, 7R, and the port 7T is connected to the other of the ports 7L, 7R via these annular grooves according to the relative rotation position of the valve sleeve 3. The structure of the oil path in this type of control valve is known from the prior art.

The stub shaft 5 rotates against the torsion bar 6 when the steering wheel, not shown, is rotated. The stub shaft 5 and valve sleeve 3 therefore rotate relative to each other, and the oil pressure of the pump port 7P is supplied to the port 7L or 7R so as to drive the power cylinder, not shown. At the same time, steering force directly transmitted to the rack 11 via the pinion 12 due to the twisting of the torsion bar 6. The wheels are therefore steered by the driving force of the power cylinder and the steering force directly input to the rack 11.

When the rack 11 is displaced and the pinion 12 rotates, the sleeve 3 rotates together with the pinion 12 in such a direction as to reduce the relative rotation angle of the sleeve 3 relative to the stub shaft 5. When the valve sleeve 3 rotates to a position equivalent to the rotation control angle of the stub shaft 5, steering is complete.

According to this invention, the pitches of the female screw 10 and male screw 20 are set so that even when the valve housing 2 is displaced at least 1 pitch interval in an axial direction relative to the valve sleeve 3, i.e. even when there is a relative displacement of one rotation, there is no effect on the connections between the ports 7P, 7T, 7L and 7R and the oil path of the valve sleeve 3. In other words, the dimensions of the ports 7P, 7T, 7L and 7R, and of the oil path in the control valve, are set so that displacements in the axial direction are absorbed.

Hence, when the rotation position is locked by the lock nut 8 at any rotation angle of the housing 2, it is possible to adapt to any desired relative rotation angle of the gear box 1 and the valve housing 2. The invention can therefore be applied to different vehicle types and vehicles having different engine types.

The valve sleeve 3 limits axial displacement relative to the pinion 12 due to the pin 9 and snap ring 24, and its rotation relative to the pinion 12 is also limited by the pin 9, hence even if the valve housing 2 displaces in the axial direction or rotation direction relative to the pinion 12, the relative positions of the sleeve 3 and pinion 12 do not vary in either the rotation or axial directions.

Figure 3:
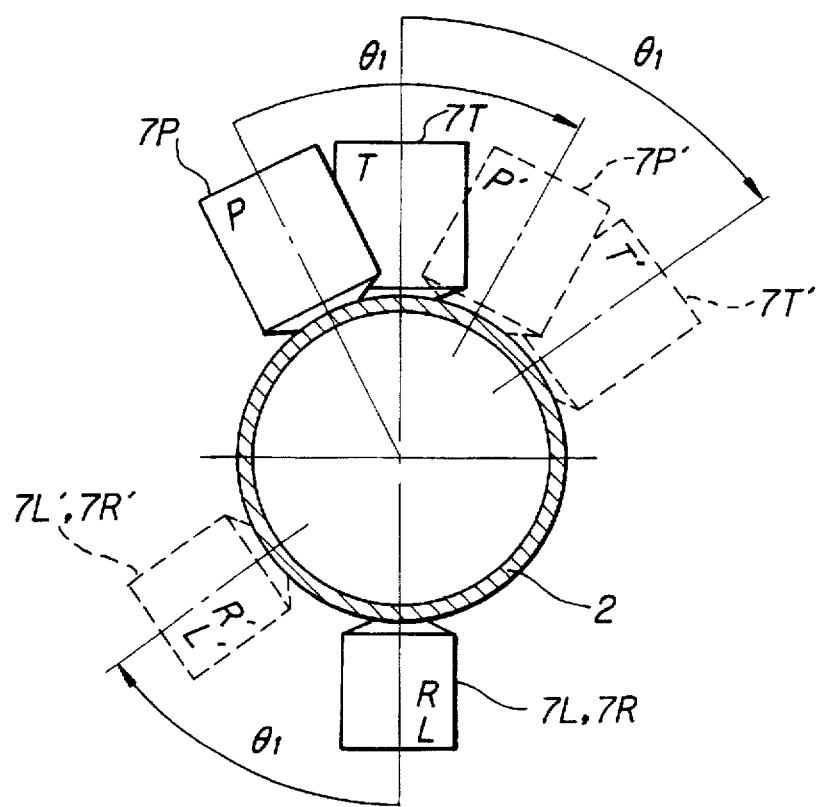
FIG. 3 is a schematic diagram showing the displacement of a port according to this invention.

For example, as shown in FIG. 3, if the valve housing 2 assembled with a predetermined phase relative to the gear box 1 is rotated by $\theta_1$, the ports 7P–7R move into positions 7P'–7R' rotated by $\theta_1$. The valve housing 2 is displaced in an axial direction relative to the valve sleeve 3 depending on this angle $\theta_1$ and the pitch, however as a predetermined working oil flowpath is maintained between the ports 7P'–7R' at least when $\theta_1 < 360°$, oil pressure is still supplied without interruption to the power cylinder, not shown.

As modifications to the positions of the ports 7P–7R can be made simply and quickly even after the power steering device is assembled by loosening the lock nut 8, rotating the housing 2 relative to the gear box 1 and tightening the nut 8 again, a single power steering device can be applied to many types and models of vehicles.

The gear box 1 is manufactured by casting, and the housing 2 is formed by drawing or extruding steel pipe followed by a plasticizing treatment. Hence, there is no thermal deformation of the housing due to casting as in the prior art, and post-casting treatment such as honing is also unnecessary.

When a defect is discovered in the valve housing 2 or gear box 1 during a final inspection of the power steering device, the lock nut 8 may be loosened, and the undamaged part removed to be used again.

Figure 4:
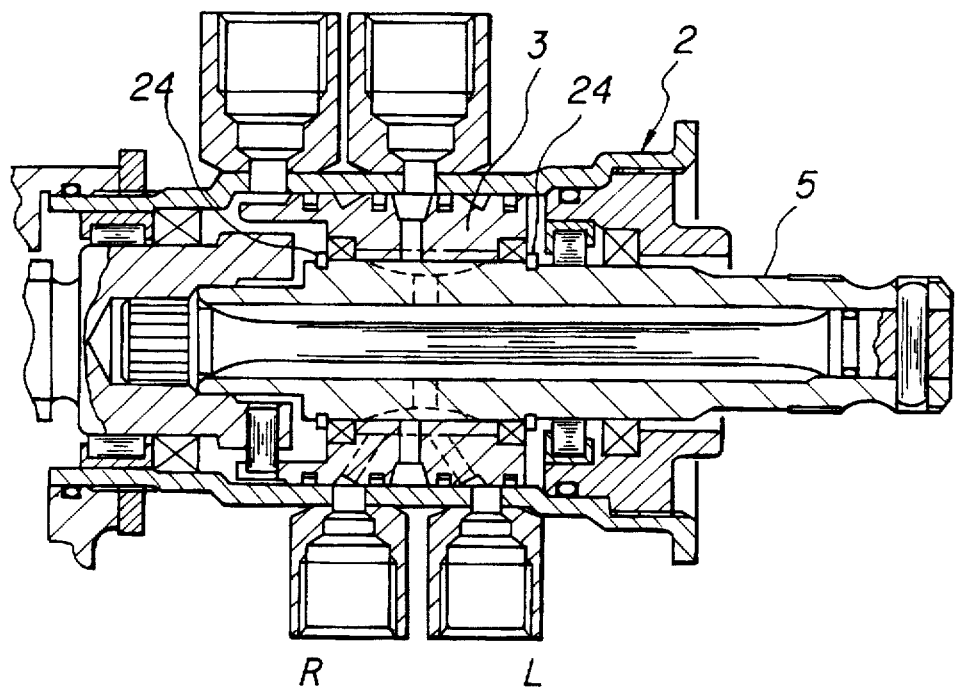
FIG. 4 is similar to FIG. 1, but showing another arrangement related to the support of the valve sleeve according to this invention.

If a pair of snap rings 24, 24 is provided on the stub shaft 5 as shown in FIG. 4, the axial displacement of the valve sleeve 3 can be even more definitively restricted.

Figure 5:
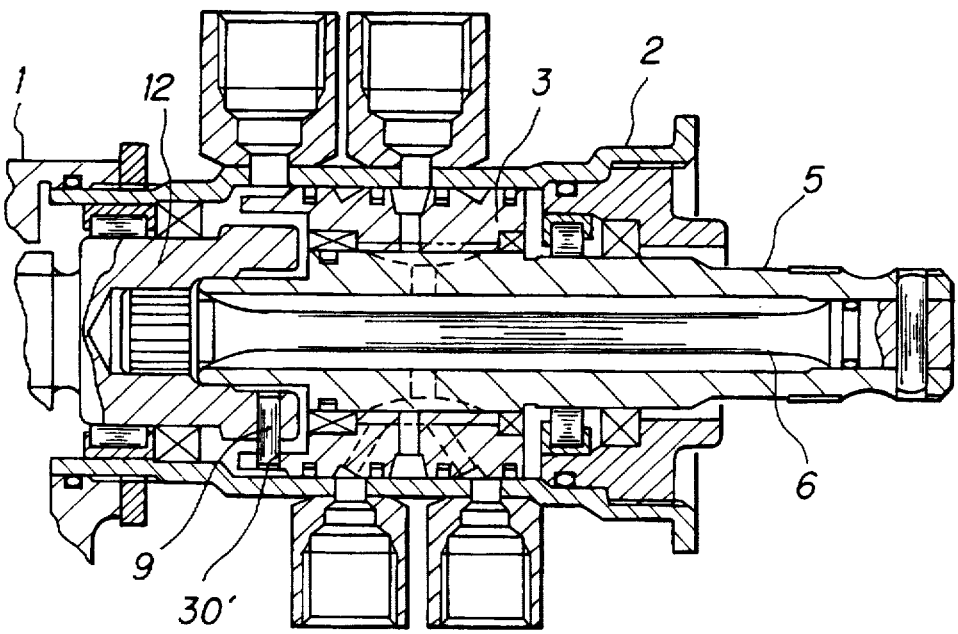
FIG. 5 is similar to FIG. 1, but showing yet another arrangement related to the support of the valve sleeve according to this invention.
Figure 6:
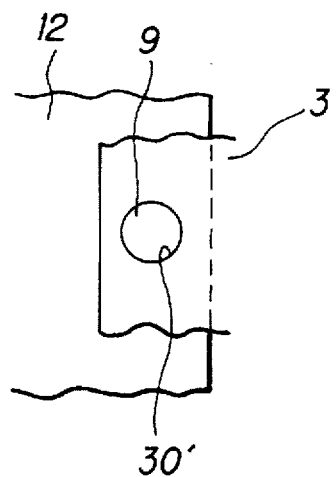
FIG. 6 is an enlarged plan view of the link between a pinion and valve sleeve of FIG. 5.

Axial and rotation displacements may also be restricted by making the pin 9 engage with a through hole 30' formed in the end of the valve sleeve 3 as shown in FIG. 5 and FIG. 6. In this case, the aforesaid snap rings 24 are unnecessary, and the position of the valve sleeve 3 relative to the pinion 12 may be precisely determined while reducing the number of component elements in the assembly.

Figure 7:
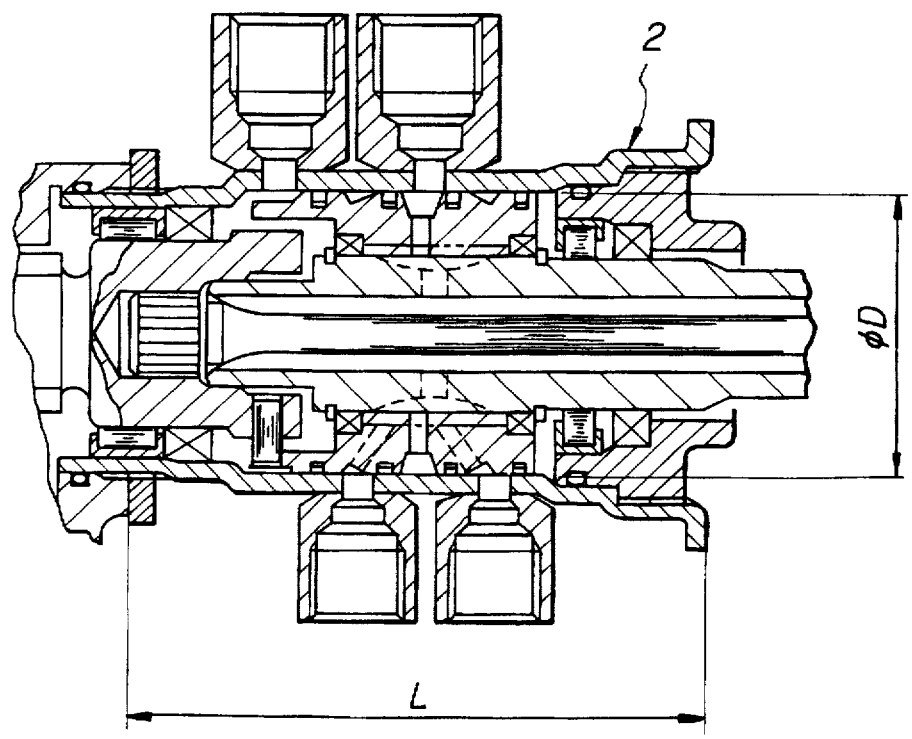
FIG. 7 is a vertical sectional view of the power steering device showing the dimensions of a valve housing according to this invention.
Figure 8:
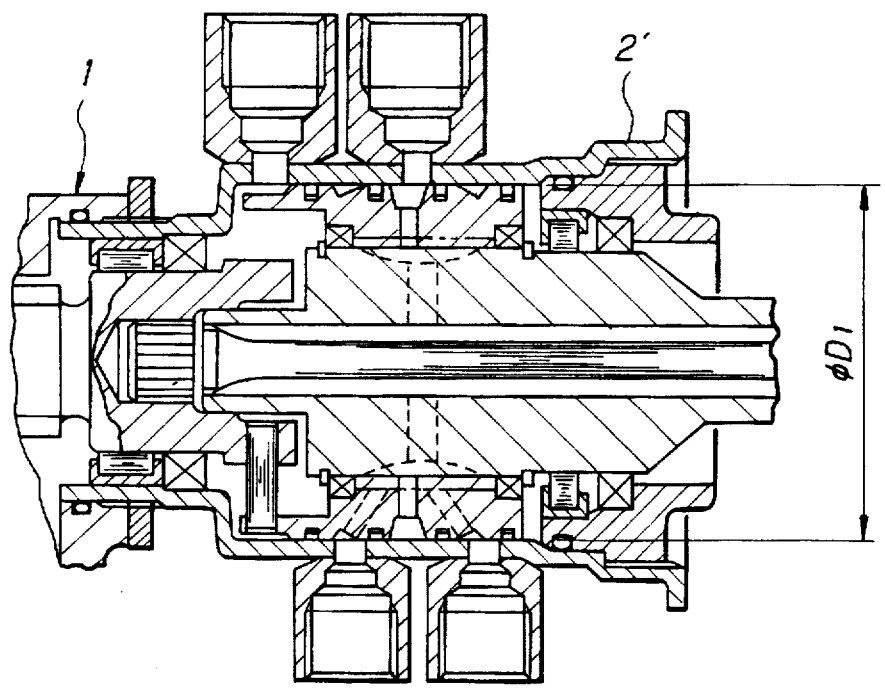
FIG. 8 is similar to FIG. 7, but showing another valve housing of a different diameter.
Figure 9:
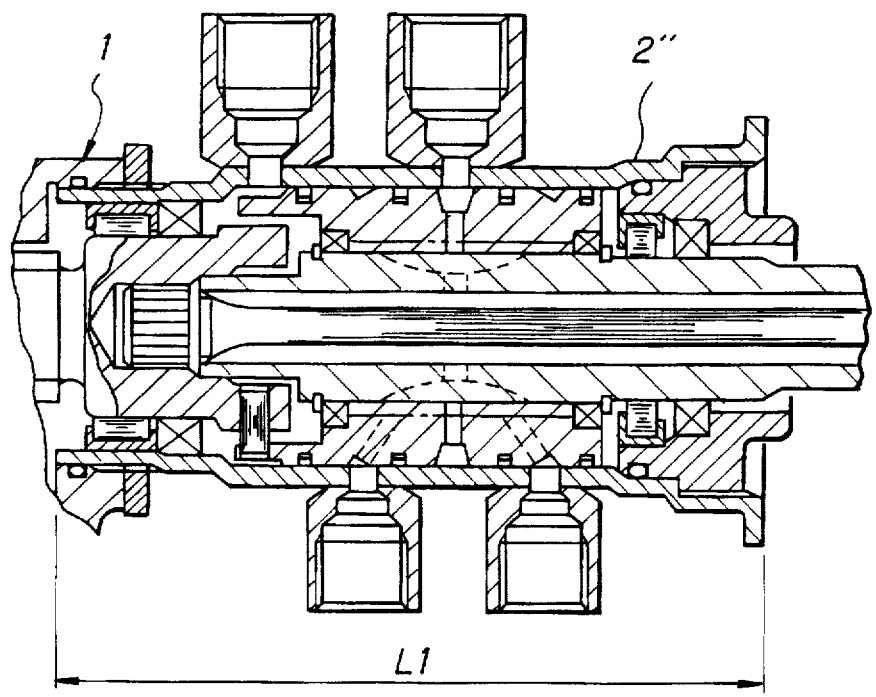
FIG. 9 is similar to FIG. 8, but showing yet another valve housing of a different length.

FIG. 7–FIG. 9 show an example where the same gear box 1 is applied to a power steering device of different capacity. The internal diameter of the valve housing 2 is D and its overall length is L as shown in FIG. 7. In FIG. 8, the same gear box 1 is assembled with a valve housing 2' having a larger internal diameter $D_1$. In FIG. 9, the same gear box 1 is assembled with a valve housing 2" having a greater overall length $L_1$.

As the gear box 1 and valve housing 2 are independent and joined by screws and the lock nut 8, the valve housings 2', 2" having larger capacities than that of the housing 2 of the first embodiment may respectively be joined to the gear box 1 provided the power steering device has the same gear ratio.

Figure 10:
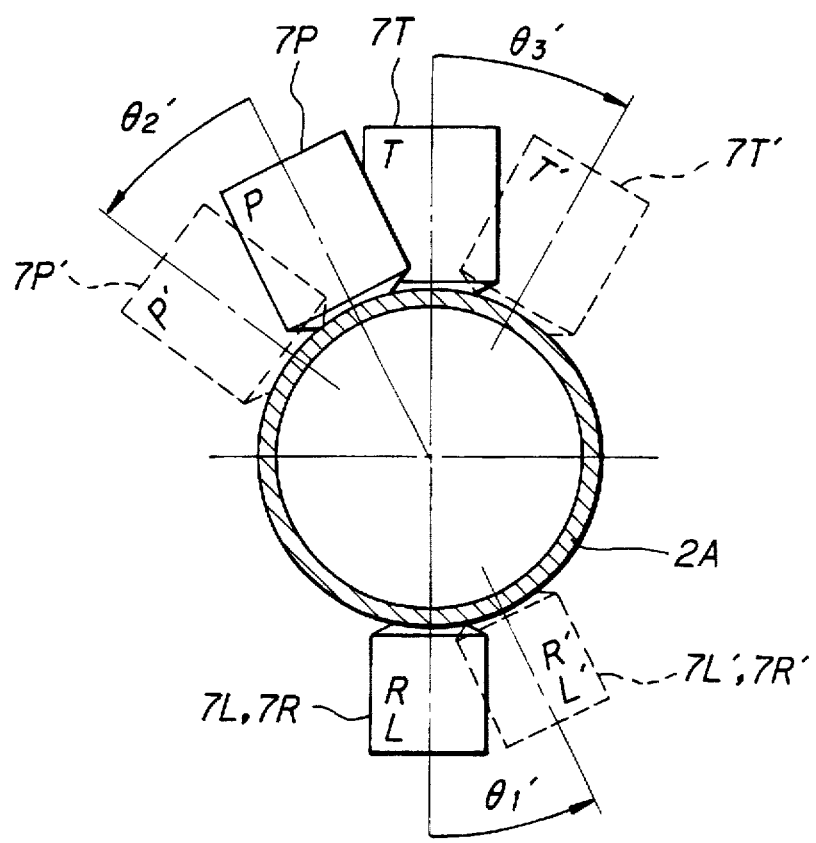
FIG. 10 is similar to FIG. 3, but showing a variation related to a port forming position.

In FIG. 10, a valve housing 2A wherein the positions of the ports 7P–7R are modified, is assembled with the gear box 1. The valve housing 2A comprises ports 7L', 7R' wherein the ports 7L, 7R have been rotated in the anticlockwise direction of the figure by $\theta_1$'. A port 7P' is provided at a position rotated anticlockwise by an angle $\theta_2$' from the port 7P, and a port 7T' is provided at a position rotated clockwise by an angle $\theta_3$' from the port 7T. The valve housing 2A wherein the positions of certain ports are modified so as not to interfere with the vehicle chassis, may therefore be assembled with the gear box 1.

Figure 11:
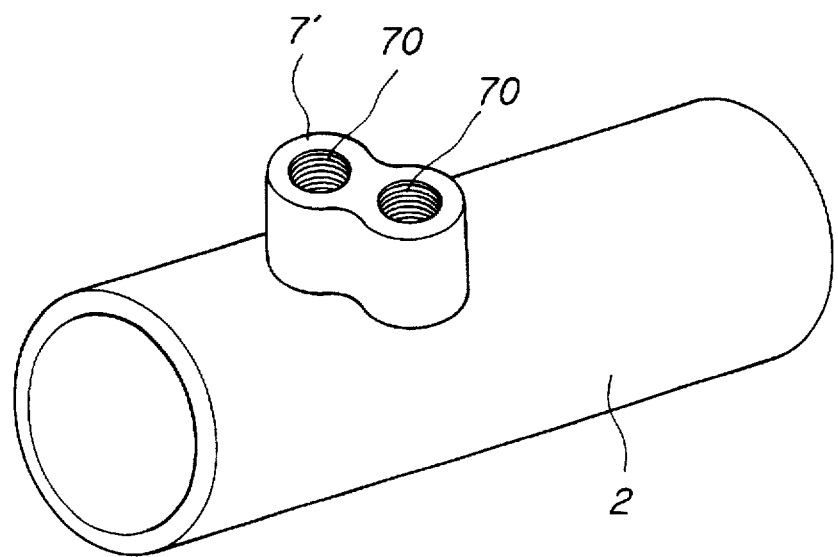
FIG. 11 is an perspective view of a port showing a variation related to a port shape.

If this type of layout should lead to mutual interference between neighboring ports, the two ports 7 may be formed together as one port 7' by casting, and this port 7' joined to the valve housing 2A by projection welding or the like, as shown in FIG. 11.

Figure 12:
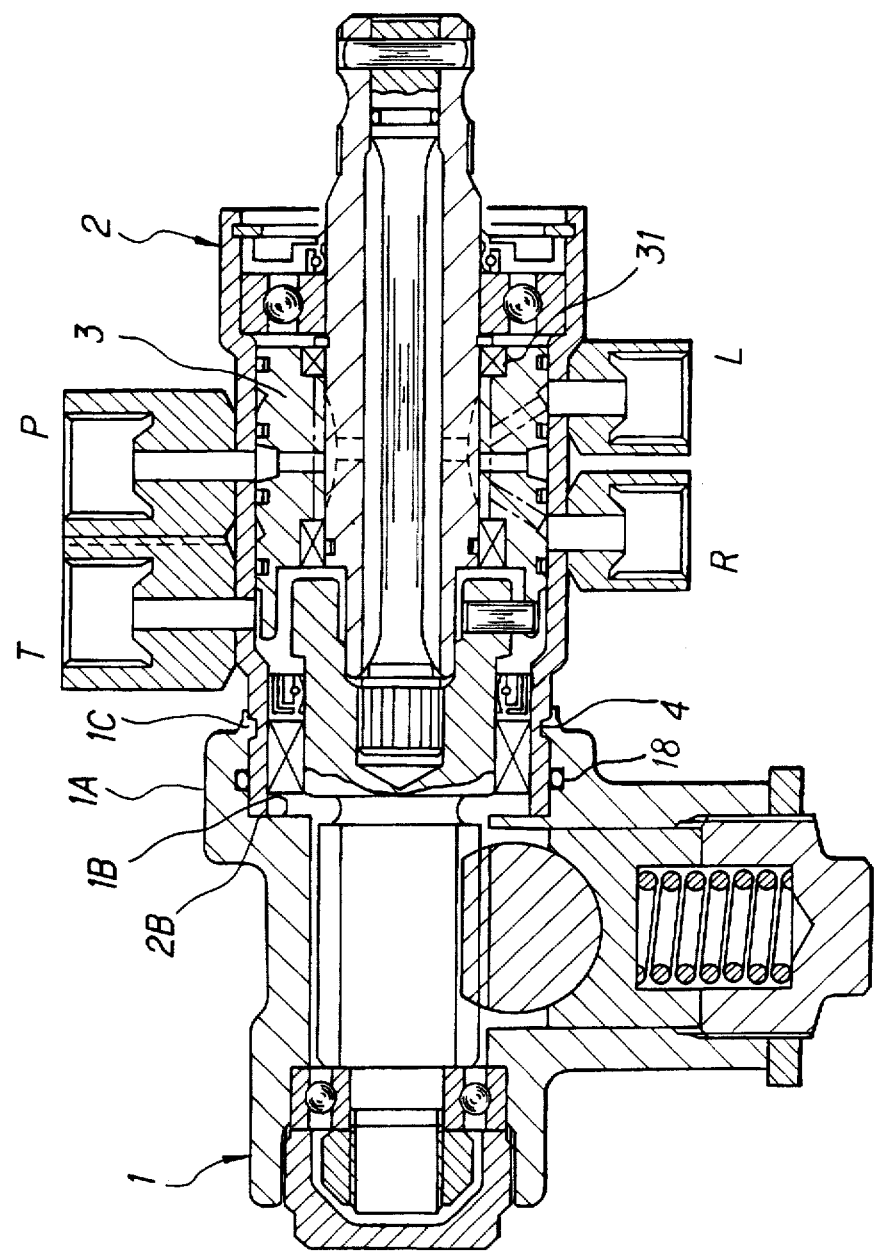
FIG. 12 is similar to FIG. 1, but showing a second embodiment of this invention.

FIG. 12 shows a second embodiment of this invention. Here, instead of screwing the valve housing 2 into the gear box 1, the valve housing 2 formed from piping material is engaged with a cylindrical part 1A of the gear box 1, and the housing 2 joined to the gear box 1 by performing a plasticizing treatment such as roll staking on an edge 1C of the cylinder 1A.

In this case, a depression 4 is first formed by turning or the like in the outer circumference of the end of the housing 2 on the side of the gear box 1, and a step 1B having a reduced internal diameter formed on the inner circumference of the cylinder 1A. An end surface 2B of the housing 2 is inserted into the cylinder 1A until it comes into contact with the step 1B, and after determining the rotation angle between the gear box 1 and housing 2, roll staking is applied. The end of the housing 2 is thereby gripped between the step 1B of the gear box and the edge 1C so as to join the housing 2 to the gear box 1. A sealing material 18 maintains sealtightness inside the power steering device.

The valve housing 2 and gear box 1 may be rotated to give a predetermined rotation angle when the housing 2 is engaged with the cylindrical part 1A, hence a single power steering device may be applied to a wide variety of vehicle types as in the case of the first embodiment. Further, various valve housings 2 may be assembled with a single gear box 1.

Figure 13:
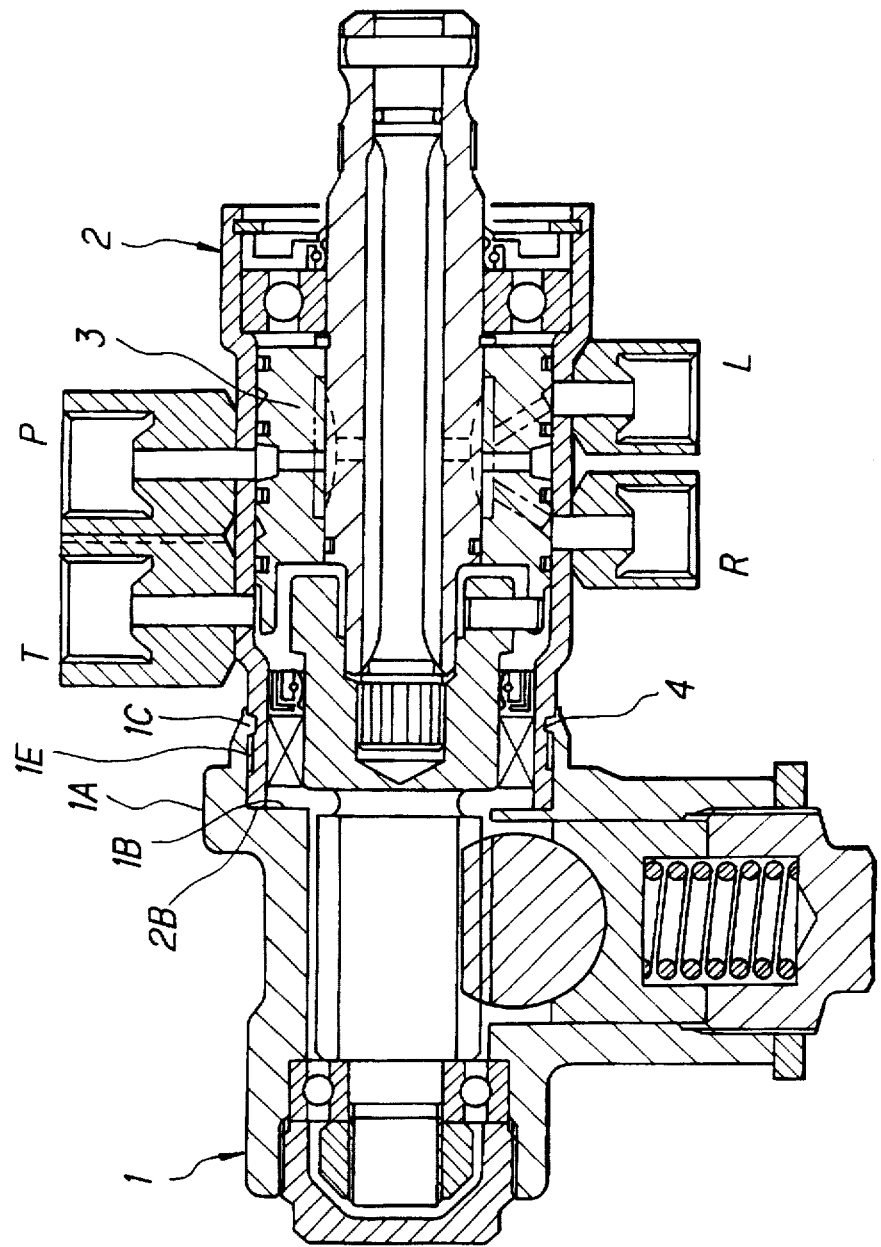
FIG. 13 is similar to FIG. 12, but showing a variation of a fixing structure of the valve housing.

If a rotation stop means 1E such as a serration or knurl is formed between the depression 4 and edge 2B of the housing 2 as shown in FIG. 13, the linkage rigidity of the housing 2 with respect to torsional external forces may be increased. This rotation stop means may be formed on either the outer circumference of the housing 2 or the internal circumference of the cylinder 1A.

In this case, as sealtightness may be maintained by joining the gear box 1 to the housing 2 such that it bites on the housing, the sealant 18 may be omitted.

Also, although not shown, the outer circumference of the cylinder part 1A may be engaged with the inner circumference of the housing 2, and a plasticizing treatment such as roll staking performed on the end of the housing 2.

The embodiments of this invention in which an exclusive property or privilege is claimed are defined as follows:

1. A power steering device for use with a steering mechanism having a power cylinder for driving said steering mechanism, comprising:
   an input shaft that rotates according to a steering input;
   a pinion connected to said input shaft via a torsion bar;
   a rack engaging said pinion and engageable with said steering mechanism;
   a valve sleeve joined to said pinion;
   a gear box housing said pinion;
   a valve housing that houses said valve sleeve such that it is free to rotate;
   an oil pressure port provided in said housing;
   said valve sleeve and said input shaft defining an oil path for supplying oil pressure to said power cylinder from said oil pressure port according to the relative rotation positions of said valve sleeve and said input shaft, wherein said valve housing and said gear box are independent; and
   means for joining said valve housing and said gear box in any desired relative rotation position including screw parts that screw into each other formed in both said gear box and said valve housing coaxially with said pinion and a lock nut that limits the relative rotation of said valve housing and said gear box joined via said screw parts, and said screw parts having pitches such that there is no obstruction to the flow of oil in said oil path when the relative rotation position of said valve housing and said gear box is varied within one rotation.

2. A power steering device for use with a steering mechanism having a power cylinder for driving said steering mechanism, comprising:
   an input shaft that rotates according to a steering input;
   a pinion connected to said input shaft via a torsion bar;
   a rack engaging said pinion and engageable with said steering mechanism;
   a valve sleeve joined to said pinion;
   a gear box housing said pinion;
   a valve housing that houses said valve sleeve such that it is free to rotate;
   an oil pressure port provided in said housing;
   said valve sleeve and said input shaft defining an oil path for supplying oil pressure to said power cylinder from said oil pressure port according to the relative rotation positions of said valve sleeve and said input shaft, wherein said valve housing and said gear box are independent; and means for joining said valve housing and said gear box in any desired relative rotation position including engaging means for rotatably connecting said gear box and said valve housing coaxially relative to said pinion, and a staking part formed on one of said valve housing and said gear box that is deformed by a staking operation to engage a corresponding portion of another one of said valve housing and said gear box to lock the relative rotation of said valve housing and said gear box.

3. A power steering device as defined in claim 2, wherein said means for joining further comprises a rotation stop means that is formed in one of said engaging means and bites on the other of said engaging means with the staking of said staking part, so as to lock the relative rotation of said gear box and said valve housing.

* * * * *